United States Patent
Vespucci et al.

(10) Patent No.: US 12,306,119 B2
(45) Date of Patent: May 20, 2025

(54) METHODS AND SYSTEMS FOR DETERMINING THE ABSOLUTE STRUCTURE OF CRYSTAL

(71) Applicant: FEI Company, Hillsboro, OR (US)

(72) Inventors: Stefano Vespucci, Eindhoven (NL); Bart Buijsse, Eindhoven (NL)

(73) Assignee: FEI Company, Hillsboro, OR (US)

( * ) Notice: Subject to any disclaimer, the term of this patent is extended or adjusted under 35 U.S.C. 154(b) by 469 days.

(21) Appl. No.: 17/939,932

(22) Filed: Sep. 7, 2022

(65) Prior Publication Data

US 2024/0077436 A1 Mar. 7, 2024

(51) Int. Cl.
*G01N 23/20* (2018.01)
*G01N 23/20058* (2018.01)
*G01N 23/2055* (2018.01)

(52) U.S. Cl.
CPC ... *G01N 23/2055* (2013.01); *G01N 23/20058* (2013.01)

(58) Field of Classification Search
CPC .................. G01N 23/2055; G01N 23/20058
See application file for complete search history.

(56) References Cited

U.S. PATENT DOCUMENTS

| | | | |
|---|---|---|---|
| 2017/0309441 A1* | 10/2017 | Flanagan, IV | H01J 37/261 |
| 2022/0216034 A1* | 7/2022 | Dobashi | G01N 23/225 |
| 2024/0282129 A1* | 8/2024 | Jeong | G06V 20/693 |

OTHER PUBLICATIONS

K. Tanaka et al., Enantiomorph identification in organic crystals by electron diffraction, J.Phys: Conf. Ser. 165 (2009) 012017.
Haruyuki Inui, et, al., New electron diffraction method to identify the chirality of enantiomorphic crystals, Acta Crystallographica Section B, Structural Science, International Union of Crystallography (2003), B59, 802-810, ISSN 0108-7681.

* cited by examiner

*Primary Examiner* — Nicole M Ippolito

(57) ABSTRACT

The crystal structure is determined based on one or more second electron diffraction patterns acquired at selected zone axes at which the strength of dynamical effect is strong. The zone axes are selected by ranking the accessible zone axes determined from multiple first electron diffraction patterns.

20 Claims, 5 Drawing Sheets

METHODS AND SYSTEMS FOR DETERMINING THE ABSOLUTE STRUCTURE OF CRYSTAL

FIELD OF THE INVENTION

The present description relates generally to methods and systems for crystallography, and more particularly, to determine the absolute structure of the crystal using electron diffraction.

SUMMARY

In one embodiment, a method for crystallography comprises acquiring multiple first electron diffraction patterns (EDPs) from at least one crystal; indexing the first EDPs to identify a plurality of zone axes of the at least one crystal; ranking the plurality of zone axes based on a strength of dynamical effects at each zone axis of the plurality of the zone axes; selecting at least one zone axis from the plurality of zone axes based on the ranking; aligning an electron-optical axis of an electron beam with the selected at least one zone axis; acquiring one or more second EDPs with the aligned electron beam; and determining an absolute structure of the crystal based on the one or more second EDPs.

In another embodiment, a charged particle microscopy system comprises: a sample holder for holding a sample including multiple crystals; an electron source for generating an electron beam; an electron-optical column for directing the electron beam towards the sample; a detector for detecting electron diffraction patterns; and a controller including a processor and a non-transitory memory for storing computer readable instructions, wherein by executing the instructions in the processor, the charged particle microscopy system is configured to: acquire multiple first electron diffraction patterns (EDPs) from at least one crystal of the multiple crystals; align an electron-optical axis of the electron beam with at least one of selected zone axes, wherein the selected zone axes are determined based on a ranking of a plurality of zone axes of the at least one crystal, the plurality of zone axes identified by indexing the first EDPs, and the plurality of zone axes are ranked based on a strength of dynamical effects at each of the plurality of zone axes; and acquire one or more second EDPs with the aligned electron beam for determining an absolute structure of the crystal.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Like reference numerals refer to corresponding parts throughout the several views of the drawings.

DETAILED DESCRIPTION

Figure 1:
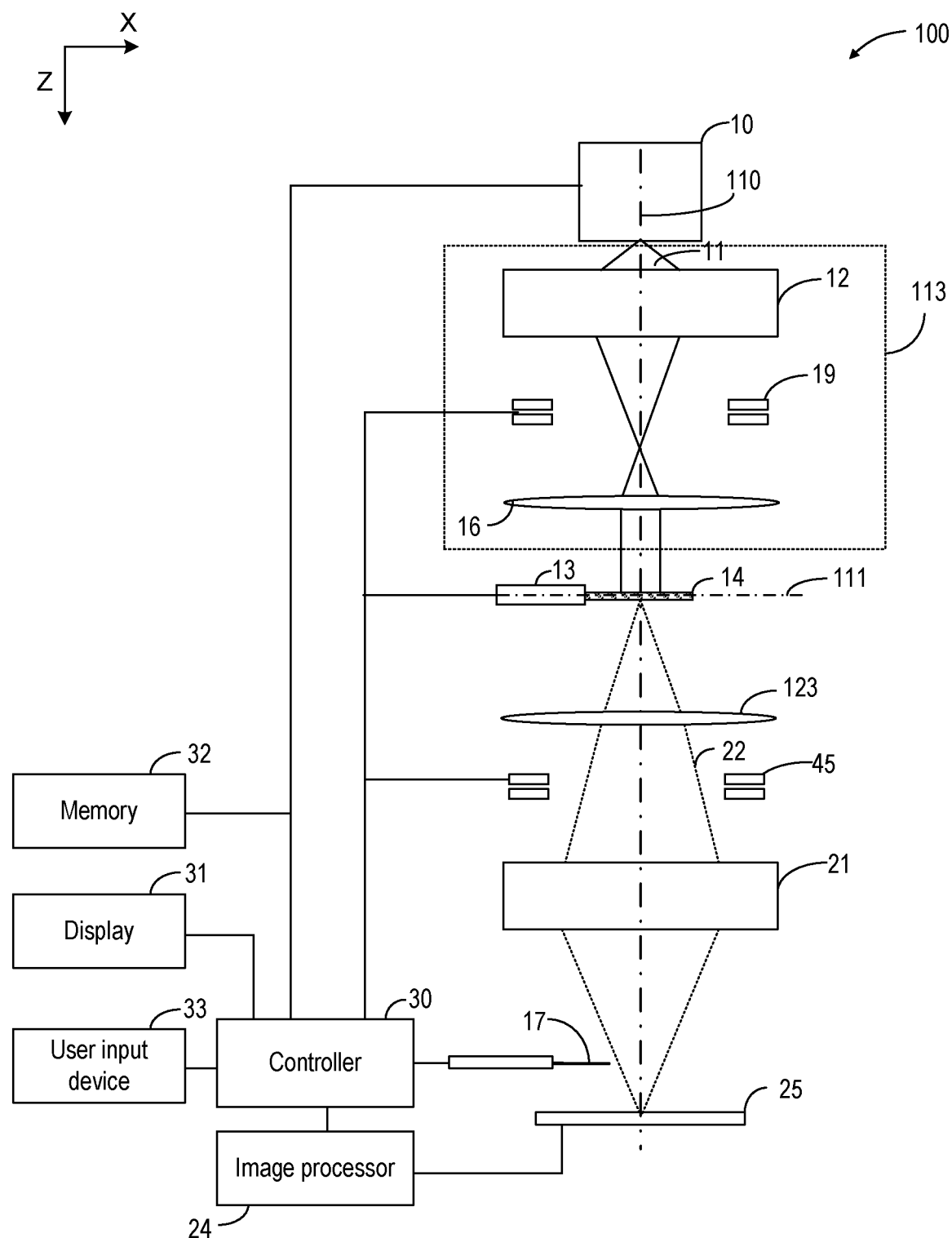
FIG. 1 illustrates a transmission electron microscopy (TEM) system operating in a first mode.

Crystallographic information of crystals can be obtained based on the electron diffraction patterns (EDPs) acquired in a charged particle microscope. In particular, a structural model can be obtained by analyzing the EDPs. The structural model may be further refined based on kinematic methods to obtain the more accurate crystal structure. For example, the structural model can be optimized by least-squares refinement of the calculated crystal structure factors against the observed diffraction data.

One of the main limitations of the above kinematic methods for structure modal refinement is the inability to determine the absolute configuration of the atomic positions in the crystal. The absolute configuration includes the chirality, the piezoelectricity and the polarity. For example, in chiral molecules, that is, molecules not having a center of symmetry, the molecule crystal can have the same chemical composition and similar structural feature, but two different absolute configurations, left-handed or right-handed (i.e., enantiomers). Without considering the dynamical diffraction effects, kinematical refinement has a 50% ambiguity on the absolute configuration of the crystal, therefore chiral identification is not possible. Moreover, current methods for determining the absolute configuration of the crystals require large amount of diffraction data, which is hard to obtain from dosage sensitive samples.

The following description relates to systems and methods for determining the absolute structure of the crystals using electron diffraction. The absolute structure includes the structure of the crystal as well as the absolute configuration of the crystal, wherein the absolute configuration includes the non-centrosymmetric properties of the crystal such as chirality. Though the description is focused on chirality, the same methods and systems can also be extended to determining other non-centrosymmetric properties such as piezoelectricity and polarity, etc.

The method includes acquiring multiple first EDPs from at least one crystal; indexing the first EDPs to identify a plurality of zone axes of the at least one crystal; ranking the plurality of zone axes based on a strength of dynamical effects at each zone axis of the plurality of the zone axes; selecting at least one zone axis from the plurality of zone axes based on the ranking; aligning an electron-optical axis of an electron beam with the selected at least one zone axis; acquiring one or more second EDPs with the aligned electron beam; and determining an absolute structure of the crystal based on the one or more second EDPs.

In this way, high quality EDPs with the strongest dynamical effects can be acquired with low overall electron dosage. This is crucial for determining the absolute structure, because the process requires a large amount of diffraction data but the quality of the EDPs may decrease quickly over time with increased electron dosage. By using the method disclosed herein, the absolute structure of the crystal can be reliable and quickly determined with less diffraction data comparing to conventional methods.

In one example, acquiring the multiple first EDPs from at least one crystal includes directing the electron beam to each of a plurality of crystals, and acquiring a plurality of EDPs at different incidence angles from each of the plurality of crystals. Acquisition of the first EDPs may be guided by an electron microscopy image of the sample, such as a transmission electron microscopy (TEM) image or scanning electron microscopy (SEM) image. The electron beam may be directed to each of the plurality of crystals based on the electron microscopy image of a sample area including multiple crystals collected before acquiring the first EDPs.

In another example, all of the multiple first EDPs may be acquired from a single crystal. The single crystal may be selected from the electron microscopy image acquired before the acquisition of the first EDPs.

The multiple first EDPs may be acquired based on methods disclosed in U.S. patent application Ser. No. 17/217,103, by Buijsse, et al, filed on Mar. 30, 2021, which is incorporated by reference herein in its entirety and for all purposes. The multiple first EDPs at a particular crystal may be acquired by adjusting a direction of the electron beam, so that each first EDPs are acquired at a different incidence angle. The number of the first EDPs acquired at each crystal of the plurality of crystals may be small to avoid radiation damage to the sample. The number of the first EDPs may be determined by the maximum electron dosage allowed to the sample. In some examples, the first EDPs provide sufficient completeness to solve the full kinematical model of the crystal structure based on the first EDPs. As such, simulated EDPs can be generated via dynamical simulation based on the structural model solved from the first EDPs.

In one example, the electron beam for acquiring the first EDPs is parallel or quasi-parallel. The first EDPs may be the selected area electron diffraction (SAED) patterns or the precession electron diffraction (PED) patterns. In another example, the electron beam for acquiring the first EDPs is a focused beam. The first EDPs may be convergent beam electron diffraction (CBED) patterns. For electron sensitive samples, SAED patterns and PED patterns may be preferred over the CBED patterns.

The at least one crystal for acquiring the first EDPs may be selected based on the electron microscopy image. The crystal may be selected based on an estimated crystal thickness. In one example, the crystal thickness may be estimated based on a thickness of the vitreous ice (i.e., ice thickness) close to the crystal. The ice thickness may be estimated based on the image contrast in the TEM image. Crystals located in a sample region with an ice thickness lower than a threshold may be selected for acquiring the first EDPs. In another example, the crystal may be selected additionally or alternatively based on the size and/or shape of the crystals in the electron microscopy image. In yet another example, the crystal thickness may be estimated based on the electron energy loss spectroscopy (EELS) signals. For example, the crystal thickness can be estimated from the zero-loss peak extracted from EELS spectrum in a particular energy range.

The multiple first EDPs may be indexed manually or automatically to identify a plurality of zone axes of the at least one crystal. The indexing process may be carried out using for example the DIALS software. The EDP indexing process may output one or more of the crystal information including crystal orientation, unit cell parameters, and output the experimental geometry, i.e. beam direction, rotation axis of the stage (or sample holder), detector position and orientation. Based on the indexing output, zone axes orientations of one or more of the crystals, which are accessible by the imaging system, may be identified. A particular zone axis of a crystal is accessible by the imaging system when the electron-optical axis of the electron beam can be aligned with the zone axis of the crystal under current system configuration, with beam direction adjustment and/or sample stage movement (translation and rotation).

In one example, the structural model of the crystal may be solved based on the first EDPs. The structural model of a crystal represents the complete/whole structure of the molecule. That is, each molecule can be uniquely defined by its structural model. The structural model may include one or more of crystal parameters including the crystal type, the crystal geometry, the unit cell dimensions, and the atomic positions. If sufficient data are gathered from the first EDPs, the structural model and the absolute configuration may be obtained from the first EDPs. However, for most samples, due to the limit of the maximum electron dosage, it is difficult to acquire sufficient high quality diffraction data for determining the absolute configuration. In other words, the crystal is likely destroyed before the EDP showing strong dynamical effects can be obtained. Therefore, herein, the structural model solved from the first EDPs is refined using the second EDP to obtain the absolute configuration of the crystal, wherein the second EDP is acquired at or near a zone axis that shows strong dynamical effects. In one example, the absolute configuration can be determined with one second EDP.

In another example, the structural model may be obtained from external sources.

The strength of the dynamical effects at each zone axis of the identified plurality of the zone axes may be determined through a dynamical simulation based on crystal information. The crystal information may include one or more of the chemical composition of the crystal, the crystal symmetry, and the dynamics of electron-sample interaction. The crystal information may be obtained from prior sample knowledge and/or by analyzing the first EDPs. For example, the strength of the dynamical effects at each zone axis of the identified plurality of the zone axes is determined based on the structural model solved from the first EDPs. The strength of the dynamical effects at a particular zone axis may be defined by an asymmetry in amplitudes of the Bijvoet pairs. In one example, the simulated EDP at each of the plurality of zone axes may be generated through the simulation. The strength of dynamical effects at the zone axis may be determined based on the asymmetry in amplitudes of the Bijvoet pairs in the simulated EDPs. The simulated EDP may include a subset of all reflections observed at a particular zone axis. For example, the simulated EDP may include only Bijvoet pairs with asymmetric amplitudes (i.e., asymmetric Biojvoet pairs). Therefore, the strength of the dynamical effects may be determined based on the simulated asymmetric Biojvoet pairs.

Figure 6A:
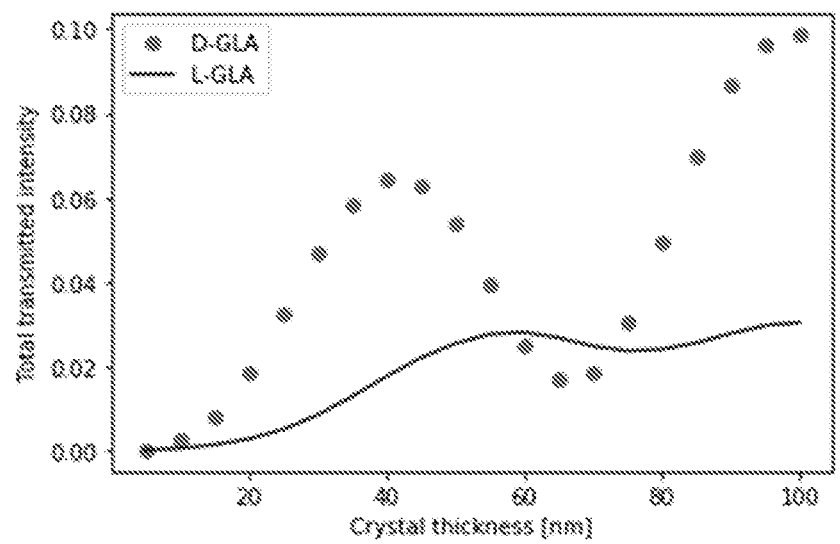
FIGS. 6A and 6B are graphs showing intensities of different reflections of enantiomers versus crystal thickness.
Figure 6B:
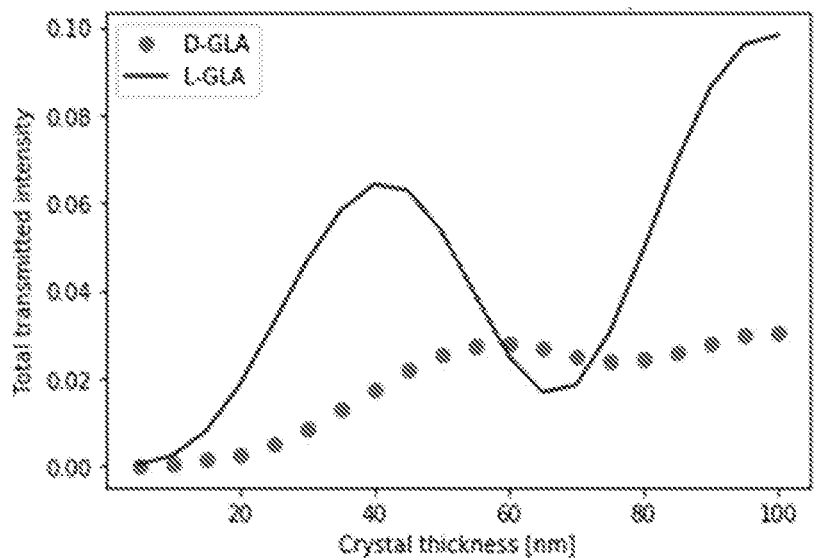

As shown in FIGS. 6A and 6B, the strength of the dynamical effects is affected by crystal thickness. The strength of the dynamical effects at each zone axis of the plurality of the zone axes may be further determined based on the crystal thickness estimated during indexing the first EDPs. For example, the simulation may utilize the estimated crystal thickness to determine the strength of the dynamic effects.

The identified zone axes may be ranked based on the strength of the dynamical effects calculated from the simulated EDPs. One or more higher ranking zone axes may be selected for acquiring the second EDPs. In one example, the process of ranking the zone axes may generate a list of ranked zone axes, with corresponding beam and stage maneuverings for aligning the beam with the axis.

The identified zone axes may further be ranked based on the accessibility by the electron beam. The zone axis to which the electron-optical axis of the electron beam can be reliably aligned may be ranked higher. For example, a first zone axis of one crystal accessible with only beam tilt and deflection is ranked higher than a second zone axis of the same or a different crystal accessible through both beam tilt and deflection and sample stage movement.

In some examples, because the imperfections in the crystal, the full dynamical modelling of the intensities becomes too difficult. For this reason, certain strong zone axes are typically removed from experimental data before processing. In these cases, some of the ranked accessible zone axes may be adjusted for removed from the ranking. As a result, in one example, the second EDP won't be acquired at these zone axes. In another example, location of these zone axes to be aligned with is adjusted, for example in the list of ranked zone axes, so that the second EDP is acquired at a non-zero angle (e.g. an angle greater than a threshold angle) from the zone axis.

Aligning the electron-optical axis of the electron beam with a selected zone axis includes adjusting at least a direction of the electron beam so that the electron-optical axis of the electron beam is substantially aligned with the selected zone axis. In some examples, mechanical movement of the sample stage (or sample holder) may also be required to align the electron-optical axis of the electron beam. Aligning the electron beam with the selected zone axis may include adjusting the electron beam and/or the sample position according to the outputs from indexing the first EDPs. The alignment of the electro-optical axis of the electron beam with the selected zone axis may be guided and/or confirmed based on further acquired EDPs.

The electron beam for acquiring the second EDPs may be parallel, quasi-parallel, or focused. The second EDPs may be one of the SAED patterns, the PED patterns, and the CBED patterns. For electron sensitive samples, SAED patterns and PED patterns may be preferred over the CBED patterns. On the other hand, CBED patterns are more sensitive to non-centrosymmetric properties, hence they are preferable when possible. At each selected zone axis, the SAED patterns or the PED patterns may be acquired by tilting the electron beam relative to the selected zone axis.

The structural model solved from the first EDPs may be dynamically refined based on the second EDPs to obtain the absolute structure. The dynamical refinement considers the dynamical effects of electron beam interacting with the crystal lattice. For example, the structural model may be dynamically refined by comparing the structural model considering the dynamical diffraction effects with the observed second EDPs. In some examples, the second EDPs and the first EDPs may be combined into a combined dataset, and the structural model maybe dynamically refined based on the combined dataset. For example, in each iteration, the structural model is refined with one of the EDPs. The refinement may be completed responsive to the R-factor (a measure of the agreement between the crystallographic model and the experimental diffraction data) greater than a threshold R-factor value.

In one example, the structural model may be iteratively refined. For example, in each iteration, the structural model is refined with one of the first or second EDPs. In some examples, crystal thickness may be an output of the refinement process. The crystal thickness may be estimated during each iteration and used to refine the structural model in the next iteration.

In one example, the second EDPs may be acquired at a higher beam energy comparing to the first EDPs. In another example, if the first EDPs and the second EDPs are the same type of electron diffraction patterns, for example, SAED patterns or PED patterns, the number of the second EDPs may be greater than the first EDPs.

In this way, the absolute structure of the crystal, including the absolute configuration of the crystal, may be reliable determined. By dynamically refining the structural model using the second EDPs acquired at specific orientations (e.g. along or near the selected zone axes), the structural model can quickly converge to reveal the absolute structure of the crystal. Throughout the data collection process, the total electron dosage to the sample may be kept minimal by collecting only diffraction data critical for solving the absolute structure.

The first and second EDPs may be acquired in a charged particle microscope (CPM) in either the transmission mode or the reflection mode. The CPM may be any one or a TEM system, a SEM system, or a STEM (scanning electron microscopy) system. The first and second EDPs may be processed by a controller including at least a processor. The controller may be the controller locally located within the CPM. The controller may alternatively include one or more processors remotely connected with the CPM via a network. The acquired EDPs may be sent to a remotely located processor for processing. For example, the computation heavy part of the method, such as indexing the EDPs, solving the structural model, ranking the zone axes, and the structural model refinement, may be performed by the remotely located processor(s), such as in a cloud server. In one example, the first EDPs may be sent to a remotely located processor for indexing and zone axis ranking. The ranked zone axes may be sent back to the CPM for acquiring the second EDPs.

In some examples, after acquiring the first and second EDPs, the electron diffraction data may be stored in a non-transitory memory, and post-processed by processor(s) for determining the absolute configuration of the crystals.

Figure 2:
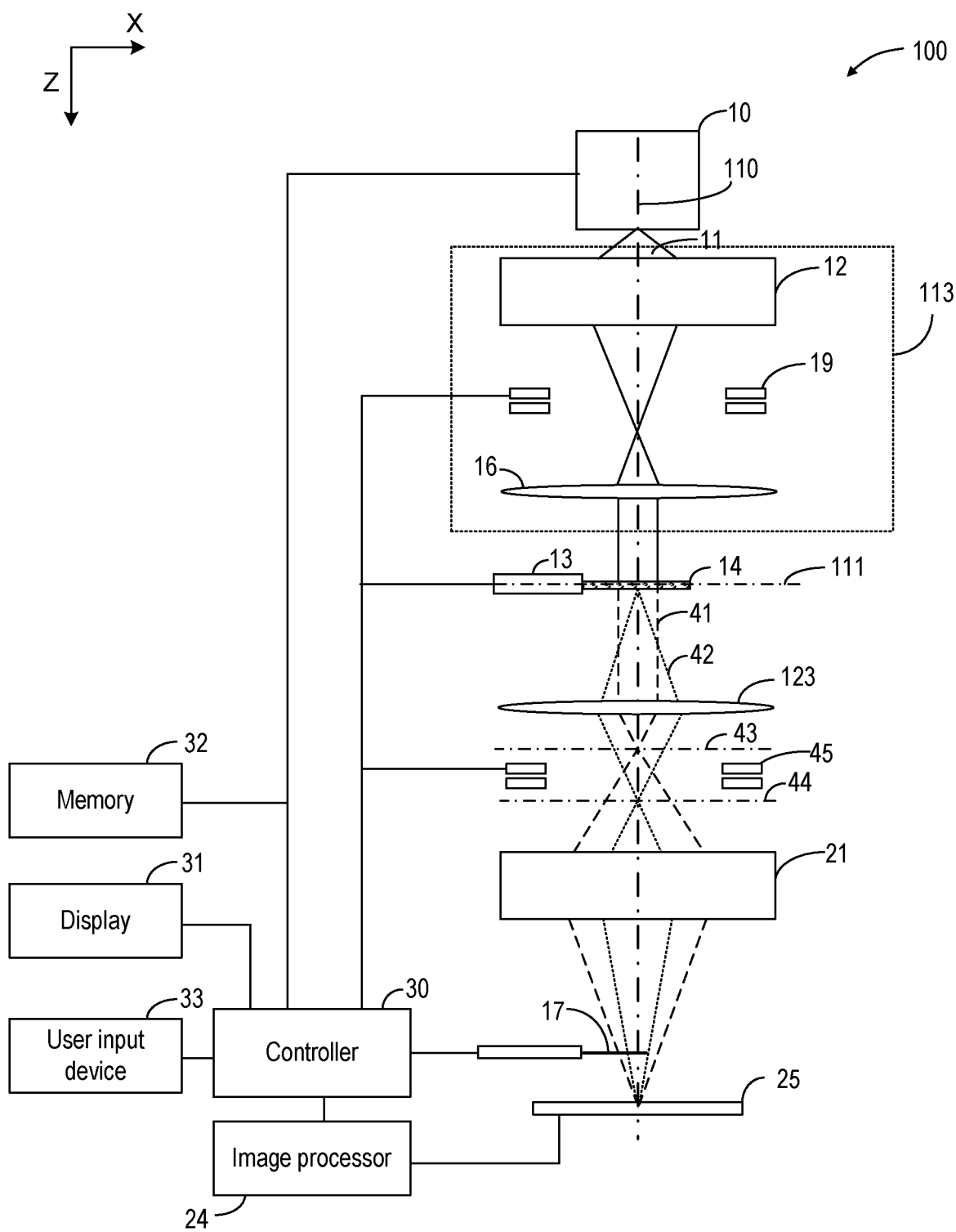
FIG. 2 illustrates the TEM system of FIG. 1 operating in other modes.

Turning to FIGS. 1-2, an example of the CPM, a transmission electron microscopy (TEM) system 100, is shown in different modes of operation. The TEM system may be a cryogenic electron microscopy system for imaging sample cooled to cryogenic temperatures. The TEM system 100 includes an electron source 10 that emits electron beam 11 along optical axis 110. The electron beam is directed towards a sample 14 held by a sample holder 13 along an electron-optical axis via an electron-optical column 113. The electron-optical axis may be aligned with the optical axis 110. The electron-optical column may include one or more of condenser optics, deflectors, and objective lens. In some embodiments, the condenser optics 12 may include one or more condenser lenses and one or more apertures. Deflector 19 positioned downstream of the condenser optics 12 shifts and/or tilts the electron beam relative to optical axis 110. Pre-sample objective lens 16 positioned downstream of the deflector 19 collimates the electron beam and directs the electron beam onto sample 14. The sample 14 may be held by the sample holder 13 in a specimen plane 111. In some examples, the sample is positioned on a TEM grid attached to the sample holder. The sample holder 13 may adjust sample position by tilting the sample relative to the electron-optical axis and/or translating the sample within the specimen plane. Scattered electrons transmitted through sample 14 sequentially passes through post-sample objective lens 123 and projector system 21, and are collected by detector 25 positioned on the opposite side of sample 14 relative to electron source 10. The detector 25 may detect the received electrons and send the signal to image processor 24 to form an image. The detector 25 may include an amplifier for amplifying the signal before sending the signal to the image processor 24. In one example, the detector 25 may be a CCD camera or a CMOS camera. In some embodiments, different detectors may be used for diffraction pattern acquisition and sample image acquisition.

FIG. 1 shows the TEM system 100 operated in the low magnification (LM) imaging mode. Dashed lines 22 illustrate beam path of scattered electrons from a point of the sample to detector 25 in the LM imaging mode, wherein the post-sample objective lens 123 is off or operated with low excitation voltage for acquiring a sample image with large FOV and low resolution. Beam stopper 17 may be used to intercept the intense unscattered beam. The projection system 21 is operated differently in an imaging mode (such as LM imaging mode or SA imaging mode) and in a diffraction mode (such as SA diffraction mode). The LM imaging mode may be used for inspect a large sample area, and locate sample regions for collecting EDPs.

FIG. 2 shows the TEM system 100 operated in the SA imaging mode and the SA diffraction mode. Dashed lines 41 illustrate beam path of scattered electrons from sample 14 to detector 25 in the SA diffraction mode. In the SA diffraction mode, the projector system 21 images the back focal plane 43 of the post-sample objective lens 123 to detector 25. The beam stopper 17 is inserted into the electron-optical 110 to block the unscattered beam. Dashed lines 42 illustrate beam path of scattered electrons from sample 14 to detector 25 in the SA imaging mode. In the SA imaging mode, the specimen plane 111 is imaged to the SA plane 44, and the projector system 21 images the SA plane 44 to detector 25. The beam stopper 17 is retracted from the electron-optical 110. Sample image acquired in the SA imaging mode may have a smaller FOV and higher magnification comparing to the sample image acquired in the LM imaging mode. In one example, a SA aperture may be inserted in the beam path. The SA aperture may be the positioned in the SA plane 44. Alternatively, an aperture in the condenser optics 12 may serve as beam limiting aperture. In another example, an image deflector may be positioned between the sample and the detector for shifting and tilting the electrons transmitted through the sample back to the electron-optical, so that the ED pattern stays centered on the detector during beam tilt and the image stays centered on the detector during beam shift. The image deflector 45 may be positioned between the back focal plane 43 and the SA plane 44.

The controller 30 may control the operation of TEM system 100, either manually in response to operator instructions or automatically in accordance with computer readable instructions stored in non-transitory memory (or computer readable medium) 32. The controller 30 may include a processor and be configured to execute the computer readable instructions and control various components of the TEM system 100 in order to implement any of the methods described herein. For example, the controller may adjust the TEM system to operate in any one of the LM imaging mode, SA imaging mode, and the SA diffraction mode by adjusting one or more of the SA aperture 18, the excitation of the objective lens 123, the beam stopper 17, and the projector system 21. The controller 30 may adjust the beam location and/or the beam incident angle on the sample by adjusting the deflector 19. The controller 30 may further be coupled to a display 31 to display notifications and/or signals detected by detector 25. The controller 30 may control the TEM system to acquire any of the SAED patterns, PED patterns, and CBED patterns. The controller 30 may receive user inputs from user input device 33. The user input device 33 may include keyboard, mouse, or touchscreen. The controller may be configured to extract crystallographic information of the crystals based on the acquired datasets.

Though the TEM system is described by way of example, it should be understood that the sample image and diffraction pattern may be acquired with other CPMs. For example, the CPM is a scanning transmission electron microscopy (STEM) system. In that case, sample images can be made in scanning STEM mode, and diffraction images can be obtained with a (quasi) parallel beam. In another example, the CPM is a SEM. The present discussion of the TEM system is provided merely as an example of one suitable imaging modality.

Figure 3:
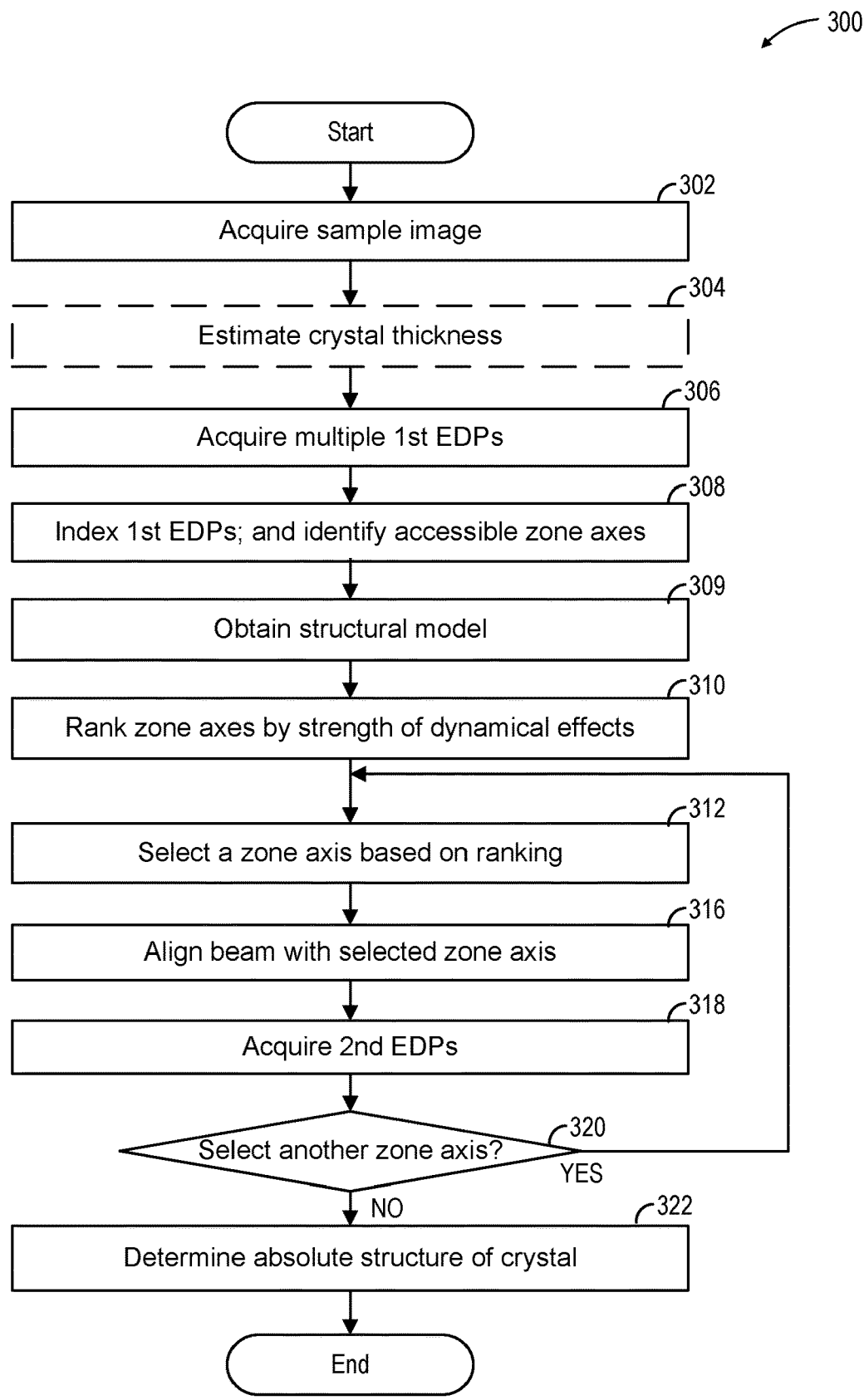
FIG. 3 is a method for determining the absolute structure of a crystal.

FIG. 3 shows method 300 for determining the absolute structure of a crystal using electron diffraction data. Multiple first EDPs are acquired for indexing. Through the indexing process, the accessible zone axes are identified. The identified zone axes are then ranked for determining the sequence at which the second EDP(s) are collected. The second EDPs are acquired at higher ranked zone axes (that is, zone axes with stronger dynamical effects) are collected first to ensure successful structural model refinement to obtain the absolute structure of the crystal.

At 302, after loading the sample into the microscope, one or more electron microscopy images of the sample are first acquired. The sample may be crystals held by a TEM grid that is cryo-frozen. For example, TEM images of the sample may be acquired in either or both the LM imaging mode and the SA imaging mode shown in FIGS. 1-2. The electron microscopy images may be used for selecting and locating crystals for acquiring the first EDPs. The crystals in the electron microscopy image may be selected based on the crystal thickness estimated in the electron microscopy image.

At 304, crystal thickness is optionally estimated. In one example, the crystal thickness may be estimated based on the sample images acquired at 302. The estimated crystal thickness may be used for determining the strength of the dynamical effects at a particular zone axis. In one example, ice thickness is estimated based on the image contrasts in different sample regions. Crystals located in sample regions with a preferred ice thickness are selected for collecting the first EDPs. Sample regions with the preferred ice thickness may have an imaging contrast lower than a threshold contrast, indicating thin ice thickness. In another example, crystal thickness may be estimated based on the contrast of crystals in the sample image. The low contrast of a crystal in a TEM image may indicate thinner crystal. In yet another example, the crystals may be selected based on their size and shape estimated in the electron microscopy images. Crystals with size lower than a threshold size may be selected for acquiring the second EDPs. In some examples, the crystal thickness may be estimated based on other signals, such as EELS signals.

At 306, multiple first EDPs of one or more crystals are acquired. The crystals for collecting the first EDPs may be selected and located in the electron microscopy images at 302. In one embodiment, the first EDPs are three-dimensional ED data collected using a parallel or quasi-parallel electron beam. For example, the electron beam is directed to each of the selected crystal. At a particular crystal, the electron beam is tilted relative to the crystal to acquire SAED patterns with different incidence angles. For example, as described in the U.S. patent application Ser. No. 17/217,103, by Buijsse, et al, filed on Mar. 30, 2021, multiple EDPs patterns are acquired by tilting the electron beam in a small angle range (e.g. −10-10 degrees). In another example, the PED patterns are acquired as the first EDPs.

At 308, the first EDPs are indexed and accessible zone axes are identified. In one example, each of the first EDPs may be individually indexed. The EDP indexing process may output one or more of the crystal information including crystal orientation, unit cell parameters, beam direction, rotation axis of the stage (or sample holder), detector position and orientation. Based on the index output, zone axes for the current crystal configuration can be computed. Based on the configuration of the microscope, accessible zone axes of the crystals that can be aligned with the electron beam are determined. The configuration of the microscope may include one or more of the beam tilt range, beam deflection range, and the ranges of the stage movement (translation and rotation). The first EDPs may be indexed using the DIALS software. The accessible zone axes may be the zone axes of different crystals.

At 309, the structural model of the crystal is obtained. In one example, the structural model may be obtained by solving the structural model using the first EDPs. The first EDPs from different crystals may be combined to determine one or more of the crystal type, the crystal geometry, and the kinematical structure. The structural model may be solved also using the DIALS software. In another example, the structural model may be obtained from external source, such as from a database or previous experiments.

At 310, the identified zone axes at 306 are ranked based on the strength of the dynamical effects that can be observed at the zone axis. The output of the ranking may be a list of ranked accessible zone axes wherein the zone axis corresponding to stronger dynamical effects is ranked higher and will be selected first for acquiring the second EDPs. The list may include coordinates of the crystal corresponding to each zone axis and the orientation of the zone axis relative to the reference system.

Figures 4A, 4B:
FIGS. 4A and 4B are simulated electron diffraction patterns (EDPs) of enantiomers at a first zone axis.
Figures 5A, 5B:
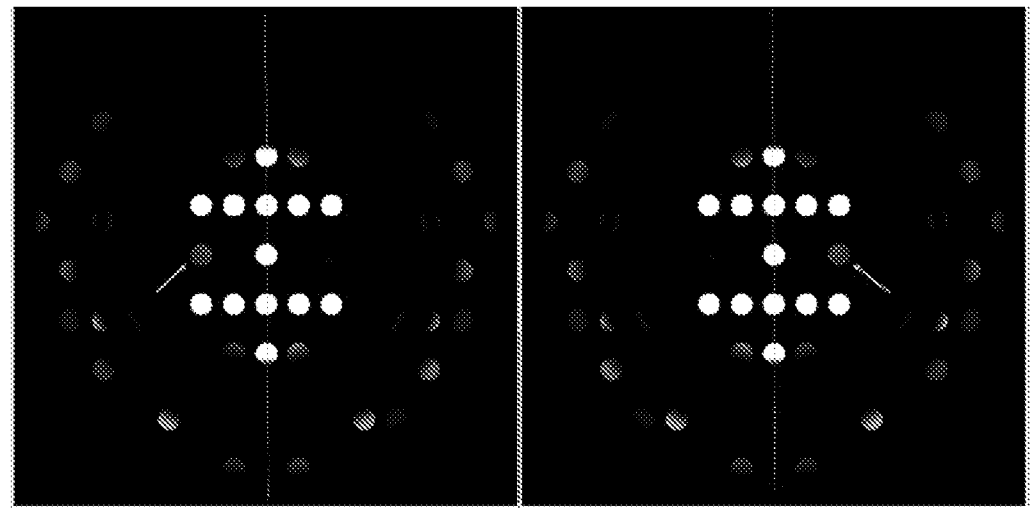
FIGS. 5A and 5B are simulated EDPs of enantiomers at a second zone axis.

The dynamical effects may be chirality-dependent dynamical effects, which cause different intensities of the Bijvoet pairs in the EDPs acquired at some zone axes. For example, FIG. 4A and FIG. 4B show simulated CBED patterns at zone axis for D-GLA and L-GLA, respectively. FIG. 5A and FIG. 5B show simulated CBED patterns at zone axis for D-GLA and L-GLA, respectively. The arrows in the figures pointed to one of the Bijvoet pairs that show asymmetry in intensities in each CBED.

The strength of the dynamical effects may be measured by the asymmetry or difference in the intensities of the Bijvoet pairs in a simulated EDP at the zone axis. In one example, the asymmetry may be calculated as a normalized contrast based on the intensities of the Bijvoet pairs:

$$\text{Normalized Contrast} = \frac{D-L}{D+L} \times 100\%, \quad \text{Equation 1}$$

wherein D and L are intensities of the Bijvoet pairs in the simulated EDP. The intensities of the Bijvoet pairs in the simulated EDP at a zone axis can be generated from a simulation based on the crystal information. The crystal information may include one or more of the chemical composition of the crystal, the crystal symmetry, and the dynamics of electron-sample interaction. Some of the known information may be obtained at 302 and 308, from the indexing results and the solved structural model. For example, the crystal symmetry information may be obtained from the indexing results. In one example, the simulation simulates the dynamical interaction between the electron beam with the crystal structure described by the structural model obtained at 309. The simulation generates simulated EDP including the intensity of the Bijvoet pairs.

In one example, the identified zone axes may further be ranked based on the estimated crystal thickness. For example, the simulation may consider the estimated crystal thickness for determining the intensities of the Bijvoet pairs. FIGS. 6A and 6B show that the intensities of the Bijvoet pairs in crystals with different chirality are affected differently by the crystal thickness. FIG. 6A and FIG. 6B are simulated intensities of (020) reflection and (0-20) reflection, respectively, of glutamic acid (GLA) in two enantiomers D(−) and L(+): D-GLA and L-GLA, in the [110] orientation. The difference in contrasts of the reflection intensities of the two enantiomers oscillates with increased crystal thickness. Therefore, using the estimated crystal thickness, it is possible to more accurately determine the strength of the dynamical effect at a particular zone axis for the crystal.

In another example, the identified zone axes may further be ranked based on the accessibility of the zone axes. For example, zone axes that can be reliable accessed (aligned with) via a combination of stage and beam movement are ranked higher.

At 312, one of the zone axes is selected based on the ranking at 310. Selecting the zone axis includes selecting the corresponding crystal that has the selected zone axis.

At 316, the electron beam is aligned with the selected zone axis of the selected crystal. The electron beam may be automatically aligned with the selected zone axis by actuating one or more of the deflectors and the sample holder based on the orientation matrix generated at 306. Aligning the electron beam with the selected zone axis includes aligning the electron-optical axis of the electron beam with the selected zone axis by either the beam direction adjustment or the combined beam and sample holder adjustments. The beam direction adjustment includes tilting the electron beam by operating the one or more deflectors. The beam direction adjustment may also include shifting the beam in the X-Y plane without changing the angle between the electron-optical axis and the sample plane. The sample holder adjustment may include translation and rotation of the sample holder that holding the sample.

At 318, one or more of the second EDPs may be acquired. The second EDP may be one or more CBED patterns, or multiple EDPs (SAED patterns or PED patterns) acquired by tilting the beam around the selected zone axis. If the second EDPs are acquired using parallel or quasi-parallel beam, the dose of each second EDP may be higher than the dose of each first EDP. Since the CBED patterns are more sensitive to the dynamic effect, they may be preferred over SAED or PED patterns for the second EDPs if the system configuration permits.

At 320, method 300 determines whether another zone axis need to be selected. Another zone axis is not selected if second EDPs have been acquired for all accessible zone axes. Another zone axis may be selected if the absolute configuration of the crystal cannot be confidently determined. For example, another zone axis may be selected if the R-factor is higher than a threshold R-factor. In some examples, if the quality of the second EDP is low, method 300 may determine to select another zone axis at 322. The quality of the EDP may be evaluated based on one or more of the number of reflections in the EDP, the intensity of the reflections, and the asymmetry in intensities of the Bijvoet pairs. In one example, if radiation damage shown in the second EDP is high (e.g. reflections disappearing), zone axis of another crystal may be selected. In another example, if the strength of the dynamical effect is not strong in the second EDPs, another zone axis of the same or a different crystal may be selected. If another zone axis needs to be selected, method 300 moves to 312 to select another zone axis. If no zone axis needs to be selected, method 300 proceeds to 322.

At 322, the absolute structure of the crystal is determined. Determining the absolute structure includes determining the absolute configuration of the crystal. In one example, the absolute structure of the crystal may be determined by refining the structural model against the second EDPs or the combined dataset from both the first and second EDPs. The structural model may be adjusted so that the R-factor calculated from the observed structure factor and the calculated structure factor is minimized. The refinement may take both the kinematical and dynamical effects of the electron-sample interactions into account. If the second EDPs are SAED patterns or PED patterns, the structural model may be refined against an integrated second EDPs. If the second EDP is CBED pattern, the absolute configuration may be determined using a single second EDP. In another example, the structural model may be solved and refined using only the second EDPs. In this example, the first EDPs are only used for determining the accessible zone axes, but not for solving the structural model.

In some embodiments, the refinement may be carried out concurrently while acquiring the second EDPs. For example, as soon as one or more of the second EDPs are acquired, they may be sent to a processor for refinement. Based on the refinement results, it may be determined whether more second EDPs need to be acquired.

In this way, the absolute structure, including the non-centrosymmetric properties, of the crystal can be effectively and automatically determined. The technical effect of acquiring the first EDPs is to determine the accessible zone axes. The technical effect of ranking the plurality of accessible zone axes based on the strength of the dynamical effects at each zone axis is to minimize the number of the second EDPs needed for refining the structural model. As such, the absolute structure of radiation sensitive crystals can be quickly determined with high quality diffraction data acquired at a relatively low total electron dosage.

Example 1 is a method for crystallography, including: acquiring multiple first electron diffraction patterns (EDPs) from at least one crystal; indexing the first EDPs to identify a plurality of zone axes of the at least one crystal; ranking the plurality of zone axes based on a strength of dynamical effects at each zone axis of the plurality of the zone axes; selecting at least one zone axis from the plurality of zone axes based on the ranking; aligning an electron-optical axis of an electron beam with the selected at least one zone axis; acquiring one or more second EDPs with the aligned electron beam; and determining an absolute structure of the crystal based on the one or more second EDPs.

Example 2 includes the subject matter of any of Examples 1, and further includes determining the strength of dynamical effects at each zone axis of the plurality of the zone axes through a simulation wherein a simulated EDP is generated at each zone axis based on a structural model of the crystal Example 3 includes the subject matter of any of Examples 2, and further includes determining the strength of the dynamical effects at each zone axis of the plurality of the zone axes based on an estimated crystal thickness Example 4 includes the subject matter of any of Examples 2, and further specifies that the structural model is determined based on the first EDPs.

Example 5. The method of claim 4, and further specifies that the first EDPs have a completeness lower than a threshold completeness.

Example 6 includes the subject matter of any of Examples 2, and further specifies that the strength of dynamical effects at each zone axis is determined based on an asymmetry of amplitudes in Bijvoet pairs in the simulated EDPs.

Example 7 includes the subject matter of any of Examples 2, and further specifies that determining an absolute structure of the crystal based on the one or more second EDPs includes determine an absolute configuration of the crystal by refining the structural model based on the one or more second EDPs.

Example 8 includes the subject matter of any of Examples 1-7, and further specifies that aligning the electron-optical axis of the electron beam with the selected zone axis includes adjusting at least a direction of the electron beam.

Example 9 includes the subject matter of any of Examples 1-8, and further specifies that indexing the first EDPs includes determining one or more of a crystal orientation, unit cell parameters, a beam direction, a rotation axis of a stage, a detector position, and a detector orientation.

Example 10 includes the subject matter of any of Examples 1-9, and further specifies that the first EDPs are acquired with a quasi-parallel electron beam.

Example 11 includes the subject matter of any of Examples 1-10, and further specifies that the one or more second EDPs are one or more CBEDs acquired with a focused electron beam.

Example 12 includes the subject matter of any of Examples 1-11, and further includes acquiring a sample image including a plurality of crystals, and selecting the at least one crystal for acquiring the EDPs from the plurality of crystals in the sample image.

Example 13 includes the subject matter of any of Examples 12, and further includes estimating a crystal thickness from the sample image, and wherein the at least one crystal is selected based on the estimated crystal thickness.

Example 14 is a charged particle microscopy system, including: a sample holder for holding a sample including multiple crystals; an electron source for generating an electron beam; an electron-optical column for directing the electron beam towards the sample; a detector for detecting electron diffraction patterns; and a controller including a processor and a non-transitory memory for storing computer readable instructions, wherein by executing the instructions in the processor, the charged particle microscopy system is configured to: acquire multiple first electron diffraction patterns (EDPs) from at least one crystal of the multiple crystals; align an electron-optical axis of the electron beam with at least one of selected zone axes, wherein the selected zone axes are determined based on a ranking of a plurality of zone axes of the at least one crystal, the plurality of zone axes identified by indexing the first EDPs, and the plurality of zone axes are ranked based on a strength of dynamical effects at each of the plurality of zone axes; and acquire one or more second EDPs with the aligned electron beam for determining an absolute structure of the crystal.

Example 15 includes the subject matter of any of Examples 14, and further specifies that determining the absolute structure of the crystal includes determining non-centrosymmetric properties of the crystal.

Example 16 includes the subject matter of any of Examples 14, and further includes adjusting the electron-optical column to direct a quasi-parallel electron beam to the sample to acquire the first EDPs, and adjusting the electron-optical column to direct a focused electron beam to the sample to acquire the second EDPs.

Example 17 includes the subject matter of any of Examples 14-16, and further specifies that the electron-optical axis of the electron beam is aligned with at least one of the selected zone axes by adjusting one or more components in the electron-optical column.

Example 18 includes the subject matter of any of Examples 17, and further specifies that the electron-optical axis of the electron beam is aligned with at least one of the selected zone axes by further adjusting the sample holder.

Example 19 includes the subject matter of any of Examples 14-18, and further specifies that acquiring multiple first EDPs from at least one crystal of the multiple crystals comprising: directing the electron beam to each of the plurality of crystals; and acquiring a plurality of EDPs at different incidence angles from each of the plurality of crystals.

Example 20 includes the subject matter of any of Examples 19, and further includes adjusting the incidence angles by adjusting a direction of the electron beam.

What is claimed is:

1. A method for crystallography, comprising:
   acquiring multiple first electron diffraction patterns (EDPs) from at least one crystal;
   indexing the first EDPs to identify a plurality of zone axes of the at least one crystal;
   ranking the plurality of zone axes based on a strength of dynamical effects at each zone axis of the plurality of the zone axes;
   selecting at least one zone axis from the plurality of zone axes based on the ranking;
   aligning an electron-optical axis of an electron beam with the selected at least one zone axis;
   acquiring one or more second EDPs with the aligned electron beam; and
   determining an absolute structure of the crystal based on the one or more second EDPs.

2. The method of claim 1, further comprising determining the strength of dynamical effects at each zone axis of the plurality of the zone axes through a simulation wherein a simulated EDP is generated at each zone axis based on a structural model of the crystal.

3. The method of claim 2, further comprising determining the strength of the dynamical effects at each zone axis of the plurality of the zone axes based on an estimated crystal thickness.

4. The method of claim 2, wherein the structural model is determined based on the first EDPs.

5. The method of claim 4, wherein the first EDPs have a completeness lower than a threshold completeness.

6. The method of claim 2, wherein the strength of dynamical effects at each zone axis is determined based on an asymmetry of amplitudes in Bijvoet pairs in the simulated EDPs.

7. The method of claim 2, wherein determining an absolute structure of the crystal based on the one or more second EDPs includes determine an absolute configuration of the crystal by refining the structural model based on the one or more second EDPs.

8. The method of claim 1, wherein aligning the electron-optical axis of the electron beam with the selected zone axis includes adjusting at least a direction of the electron beam.

9. The method of claim 1, wherein indexing the first EDPs includes determining one or more of a crystal orientation, unit cell parameters, a beam direction, a rotation axis of a stage, a detector position, and a detector orientation.

10. The method of claim 1, wherein the first EDPs are acquired with a quasi-parallel electron beam.

11. The method of claim 1, wherein the one or more second EDPs are one or more CBEDs acquired with a focused electron beam.

12. The method of claim 1, further comprising acquiring a sample image including a plurality of crystals, and selecting the at least one crystal for acquiring the EDPs from the plurality of crystals in the sample image.

13. The method of claim 12, further comprising estimating a crystal thickness from the sample image, and wherein the at least one crystal is selected based on the estimated crystal thickness.

14. A charged particle microscopy system, comprising:
   a sample holder for holding a sample including multiple crystals;
   an electron source for generating an electron beam;
   an electron-optical column for directing the electron beam towards the sample;
   a detector for detecting electron diffraction patterns; and
   a controller including a processor and a non-transitory memory for storing computer readable instructions, wherein by executing the instructions in the processor, the charged particle microscopy system is configured to:
   acquire multiple first electron diffraction patterns (EDPs) from at least one crystal of the multiple crystals;
   align an electron-optical axis of the electron beam with at least one of selected zone axes, wherein the selected zone axes are determined based on a ranking of a plurality of zone axes of the at least one crystal, the plurality of zone axes identified by indexing the first EDPs, and the plurality of zone axes are ranked based on a strength of dynamical effects at each of the plurality of zone axes; and
   acquire one or more second EDPs with the aligned electron beam for determining an absolute structure of the crystal.

15. The charged particle microscopy system of claim 14, wherein determining the absolute structure of the crystal includes determining non-centrosymmetric properties of the crystal.

16. The charged particle microscopy system of claim 14, further comprising adjusting the electron-optical column to direct a quasi-parallel electron beam to the sample to acquire the first EDPs, and adjusting the electron-optical column to direct a focused electron beam to the sample to acquire the second EDPs.

17. The charged particle microscopy system of claim 14, wherein the electron-optical axis of the electron beam is aligned with at least one of the selected zone axes by adjusting one or more components in the electron-optical column.

18. The charged particle microscopy system of claim 17, wherein the electron-optical axis of the electron beam is aligned with at least one of the selected zone axes by further adjusting the sample holder.

19. The charged particle microscopy system of claim 14, wherein acquiring multiple first EDPs from at least one crystal of the multiple crystals comprising: directing the electron beam to each of the plurality of crystals; and acquiring a plurality of EDPs at different incidence angles from each of the plurality of crystals.

20. The charged particle microscopy system of claim 19, further comprising adjusting the incidence angles by adjusting a direction of the electron beam.

* * * * *